United States Patent [19]

Michalewski et al.

[11] Patent Number: 5,065,898
[45] Date of Patent: Nov. 19, 1991

[54] APPARATUS FOR ORIENTING AND INJECTING FASTENERS

[75] Inventors: David Michalewski, Buffalo; Bradley M. Roberts, Williamsville, both of N.Y.

[73] Assignee: Gemcor Engineering Corporation, Buffalo, N.Y.

[21] Appl. No.: 594,339

[22] Filed: Oct. 9, 1990

[51] Int. Cl.$^5$ .............................................. B65H 1/00
[52] U.S. Cl. .................... 221/171; 221/172; 221/239; 221/241; 29/710
[58] Field of Search ................. 221/156–157, 221/171–173, 208, 224, 236, 238–239, 241, 245, 258; 29/771, 786, 787, 809, 709–710

[56] References Cited

U.S. PATENT DOCUMENTS

| | | | |
|---|---|---|---|
| 3,517,856 | 6/1970 | Ginther | 221/236 |
| 4,466,555 | 8/1984 | Yarnitsky et al. | 221/238 |
| 4,700,471 | 10/1987 | Shemeta et al. | 221/171 |
| 4,801,043 | 1/1989 | Cindric | 221/173 |

*Primary Examiner*—David H. Bollinger
*Attorney, Agent, or Firm*—Hodgson, Russ, Andrews, Woods & Goodyear

[57] ABSTRACT

Apparatus for initially orienting and then injecting fasteners (F) into fastener grasping fingers (46), the fasteners being received by the apparatus (10) from a non-dedicated feed tube (18). The apparatus includes, as its principle components, a mounting frame (20), an adjustable orientator (12) mounted on the frame, an adjustable injector (14) also mounted on the frame, and a dedicated feed tube assembly (16) extending between the adjustable orientator and the adjustable injector. The orientator includes right and left slides (50, 52, and 56, respectively) the spacing between them being adjustable, and further includes an orientation detector (136, 138) for determining whether or not proper orientation has been achieved. The adjustable injector includes an injector body (192), an injector slide assembly (214) slidably mounted within the body, an injector knife (226) moveable relative to the slide, and a cylinder assembly (268) for moving both the injector and the injector slide from a retracted position to an intermediate extended position, and for further moving the injector to a full injection position.

13 Claims, 7 Drawing Sheets

APPARATUS FOR ORIENTING AND INJECTING FASTENERS

TECHNICAL FIELD

The present invention relates generally to apparatus for installing fasteners, and more particularly to an apparatus for orienting and injecting fasteners having heads and tails of differing diameters, the fasteners being received from a fastener selection apparatus through non-dedicated feed tubes and being injected into fastener grasping fingers for subsequent installation and securement to two or more workpieces.

BACKGROUND OF THE INVENTION

Prior art machines for installing and securing fasteners are well known in the art and the present invention relates to such machines which are capable of installing either slug or headed rivets or two-piece pin and collar fasteners such as that type manufactured by the Huck Manufacturing Company of Fort Worth, Texas. Slug rivets are illustrated in U.S. Pat. No. 4,819,856 whereas headed rivets are illustrated in U.S. Pat. No. 4,609,134. The two-piece pin and collar fasteners are illustrated in SME paper AD84-842 and also in European patent application 03455935. These fasteners may be installed by a variety of machines and one such machine is illustrated in U.S. Pat. No. 3,534,896. In this particular form of machine a transfer mechanism is provided which performs sequential drilling, rivet upsetting, and shaving operations, the fasteners being inserted after the transfer mechanism has been shifted from its drilling position to its upsetting position.

The fastener installing machine may be provided with differing forms of mechanisms for causing the fastener to be inserted into fastener grasping fingers carried by the machine. For example, if slug rivets are being installed slug rivets will be fed from a storage hopper to a blow tube which will in turn blow the slug rivets into an injecting mechanism or directly into rivet grasping fingers of the type shown in 4,819,856 where they are axially aligned with the centerline of the aperture drilled into the workpieces prior to insertion. If a headed rivet, or a Huck fastener is to be inserted, it will be initially oriented by a mechanism associated with a feed hopper and then blown through a feed tube to an orienting and insertion device. Once such device is shown in 4,609,134 wherein the fastener is caused initially to be oriented by supporting the head of the fastener on shoulders of spaced apart rails, the tail of the fastener extending between the rails, the headed fastener then being shifted laterally by an insertion bar until it is placed between fastener grasping fingers. Various other forms of fastener orienting and insertion devices are known in the art but in all of these it is necessary that the fastener to be oriented be initially transferred through a dedicated feed tube to the orienting and insertion apparatus, which apparatus is specific for a certain tail width of the fastener. In addition, a specific or dedicated feed tube is required which is specific to the head width of the fastener in order to maintain alignment of the fastener as it is transported from the aligner disposed adjacent the feed hopper to the orienting and insertion device.

The foregoing constructions generally perform in a satisfactory manner but require changes to the rivet orienting and insertion apparatus in that every time a new fastener is selected for insertion into workpieces it is necessary to select a new orienting and insertion apparatus if the tail diameter is different. Similarly, a new feed tube is required if the head diameter is different.

In addition, it is sometimes difficult to transport the fastener from the insertion apparatus into the fastener receiving fingers, particularly when using certain forms of transfer mechanisms on the riveting machine as the transfer mechanism may require excessive clearance between its centerline and the end of the insertion apparatus which is closest to the centerline of the machine.

OBJECTS AND SUMMARY OF THE INVENTION

It is an object of the present invention to provide an apparatus for orienting and injecting fasteners which is capable of receiving a variety of fasteners having differing head and tail diameters, and which may also be utilized with rivet insertion apparatus of the type requiring a large clearance between the centerline of the transfer mechanism and the rivet insertion apparatus.

More particularly, it is an object of the present invention to provide an apparatus capable of orienting fasteners having heads and tails of differing diameters which are received from a non-dedicated feed tube extending away from a fastener selection apparatus, the orienting apparatus discharging the oriented fasteners through a dedicated feed tube to an injector having a pair of spaced apart jaws, the distance between the jaws being adjustable for receiving fasteners having tails of differing diameters whereby fasteners of differing diameters may be received and injected into rivet grasping fingers.

It is an additional object of the present invention to provide an adjustable orientation apparatus for orienting fasteners which may have heads and tails of differing diameters and which are received from a fastener selection apparatus through a non-dedicated feed tube, the orientation apparatus having jaws which adjust towards and away from each other, the orienting apparatus also being capable of determining whether or not a fastener received through the non-dedicated feed tube has become properly oriented, and if not, of initiating a fastener tumbling action to facilitate the orientation of the received fastener.

It is a further object of the present invention to provide a fastener injection apparatus for injecting fasteners into fastener grasping fingers, the injection apparatus including an injector body and an injector slide mounted within the body for sliding movement between retracted and extended positions, the injector slide including spaced apart adjustable jaws which may receive fasteners having differing tail diameters, the jaws being moveable with the injector slide, and an injector knife supported by the slide and moveable between a retracted position and an extended position wherein a fastener may be ejected from the slide to fastener grasping fingers.

The above objects and other objects and advantages of this invention will become more apparent after a consideration of the following detailed description taken in conjunction with the accompanying drawings in which a preferred form of this invention is illustrated.

DETAILED DESCRIPTION

In General

Figures 1, 2A, 2B:
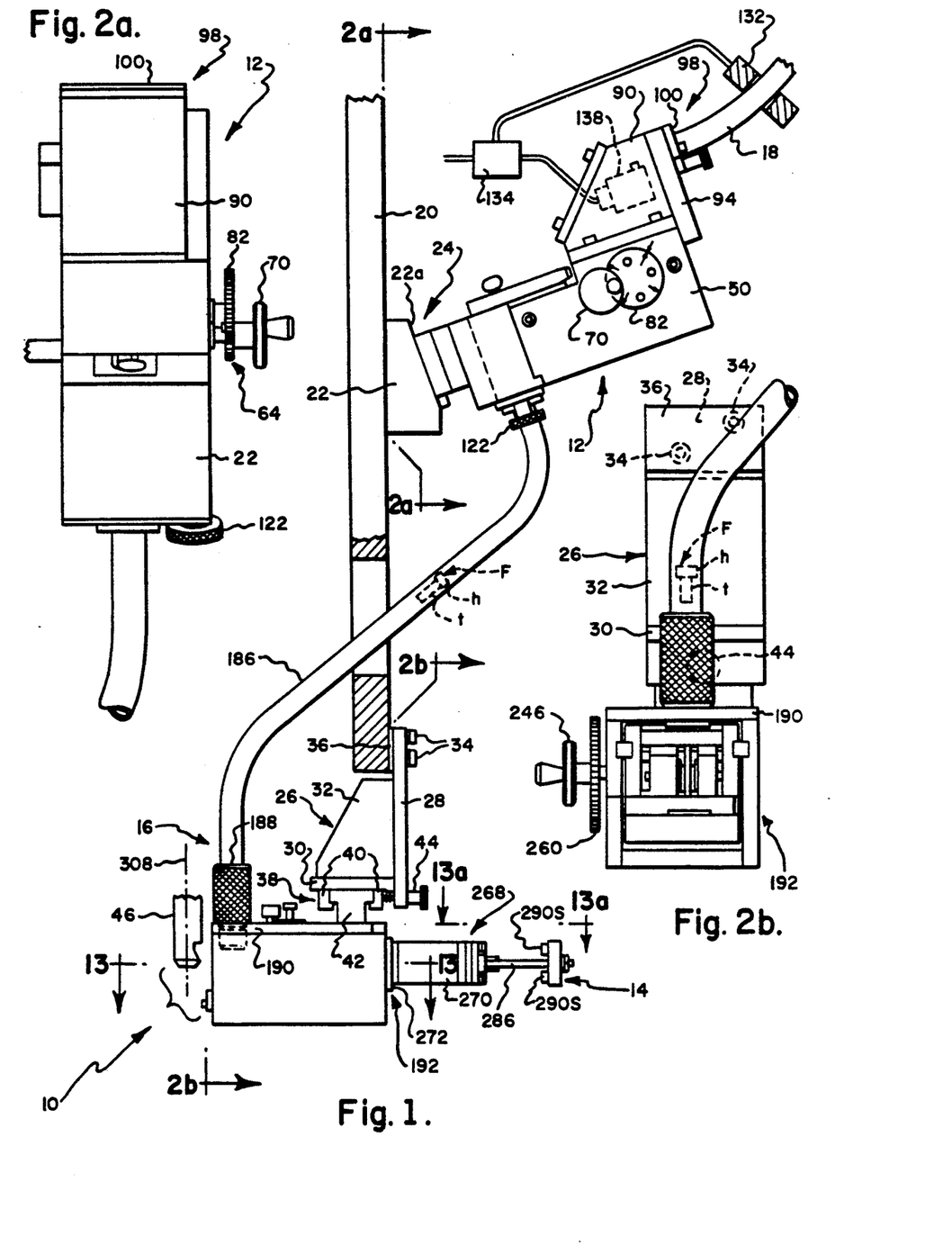
FIG. 1 is a right-side view of the orientating and injecting apparatus of this invention.
FIG. 2a is a front view of the orientating apparatus of this invention, this view being taken generally along the line 2a—2a in FIG. 1.
FIG. 2b is a front view of the injecting apparatus of this invention, this view being taken generally along the line 2b—2b in FIG. 1.

Referring first to FIG. 1, the apparatus for orientating and injecting fasteners F is indicated generally at 10 and includes, as its principal components, an adjustable orientator, indicated generally at 12, and an adjustable injector, indicated generally at 14. The adjustable orientator is interconnected with the adjustable injector by a dedicated feed tube assembly indicated generally at 16. In this description a feed tube assembly is considered to be "dedicated" when it is designed for receiving a specific size of fastener, and particularly, a fastener having a specific head h diameter. While a dedicated feed tube assembly extends between the orientator and the injector, the orientator will in turn receive fasteners through a non-dedicated feed tube 18, that is to say a feed tube which is suitable for use with fasteners having differing head diameters. Only the discharge end of the non-dedicated feed tube assembly is shown in the drawings. In practice the inlet end of the feed tube 18 will be connected to a plurality of branch feed tubes each of which is associated with its own fastener hopper. It is possible to select fasteners from any one of a variety of fastener hoppers in a manner not material to the present invention, and to feed the fastener selected through the non-dedicated feed tube to the adjustable orientator 12.

The adjustable orientator is mounted on a bracket 20. The bracket is part of a riveting machine frame, such as the type shown in U.S. Pat. No. 3,534,896, the bracket being disposed adjacent the shuttle or transfer mechanism which carries the drilling device, the rivet insertion device, and the other items which may be carried by the transfer head. As details of the riveting machine of the type referred to above are well known to those skilled in the art, they will not be described further herein.

The adjustable orientator is secured to the bracket 20 by means of a mounting block 22 which is held to the bracket by suitable screws, not shown. A mounting assembly, indicated generally at 24, is suitably secured to an inclined surface 22a of the mounting block 22. The adjustable orientator 12 is in turn secured to the mounting assembly 24 in a manner not material to the present invention. As can be seen from FIG. 1, the orientator will in operation be disposed at an angle so that that end which discharges oriented fasteners, shown to the left in FIG. 1, is disposed below that end which receives the fasteners to be oriented.

The adjustable injector is in turn mounted at the lower end of bracket 20 by an injector mounting bracket assembly indicated generally at 26. The mounting bracket assembly includes a vertical plate 28, a horizontal plate 30, and a gusset 32, the parts being welded together. The vertical plate 28 extends above gusset 32 and is provided with a pair of spaced apart apertures which receive suitable cap screw 34, the ends of which are received in suitable threaded apertures in bracket 20 to hold the injector mounting assembly securely thereto. In order to provide for suitable fore and aft spacing of the injector, a shim of a suitably selected width is disposed between the upper end of the vertical plate 28 and the lower end of the bracket 20, an exemplary shim being shown at 36. A mounting assembly 38, identical to the mounting assembly 24, is secured to the lower end of the horizontal plate 30. The mounting assembly 38 consists of two L-shaped gibs 40, the upper ends of which are secured to the horizontal plate 30, and a T-shaped slide 42 received between the L-shaped slides 40, the lower end of the T-shaped slide being secured to an upper surface of the adjustable injector 14 in a conventional manner. It can be seen that the adjustable injector can be moved from side to side by virtue of the slide assembly, and it is possible to secure the parts together in their desired position by means of a locking device 44. The purpose of the shims 36 and cross-slide assembly 38 is to ensure that the adjustable injector can be properly located horizontally with respect to the fastener grasping fingers somewhat schematically shown at 46 in FIG. 1. The fingers 46 are carried by the transfer mechanism or shuttle of the fastener applying machine and may be of differing configurations, although generally they are of the type shown in U.S. Pat. No. 4,515,302 at 302.

Adjustable Orientator

As the fasteners are being delivered to the orientator by a non-dedicated feed tube it is possible that they might tumble within the feed tube 18. Thus, the feed tube 18 must have an internal diameter large enough to accept the largest diameter fastener heads, and as small fasteners may be conveyed through the feed tube, it is possible that very small fasteners, and particularly those having short tails t, may tumble within the feed tube. The adjustable orientator includes, as its major components, a rivet slide including a rivet slide body 50 to which is secured an upper slide body 52 by threaded fasteners 54 (FIG. 5), the rivet slide also including a sliding jaw 56 as viewed in FIG. 5. Thus, the upper slide body 52 forms one jaw of a pair of spaced apart jaws, the other jaw being the sliding jaw 56. The sliding jaw 56 is supported upon a key 58 for side-to-side movement, the jaw normally being biased to the left as viewed in FIG. 7. To this end, a pair of socket head shoulder screws 60 are received in suitable apertures 50a in the rivet slide body 50, the ends of the screws being screwed into threaded apertures in the sliding jaws 56. Compression springs 62 (FIG. 7) are disposed between the head of the shoulder screw and an annular surface in the aperture 50a to bias the shoulder screws and correspondingly the sliding jaw to the left as viewed in FIG. 7.

The sliding jaw 56 can be moved by operation of an adjusting mechanism indicated generally at 64. The adjusting mechanism consists of an adjusting screw 66 (FIG. 5), having a threaded end 66a received within a threaded aperture of the sliding jaw 56, an intermediate enlarged-diameter portion 66b rotatable with the threaded portion but held from relative movement by a lock screw 68 which engages a groove 66c in the enlarged-diameter portion 66b. A knob 70 is secured about an externally extending cylindrical end portion 66d by roll pins 72 or the like, the knob 70 being provided with a spur gear 74. Mounted on the knob 70 is a rotating handle 76 which is secured to an index pin 78 by roll pin 80. The end of the index pin 78 remote from the handle 76 will normally be biased through a suitable aperture 82a (FIG. 3) in an index gear 82, the index gear being provided with suitable indicia 84 which can be matched up with corresponding indicia 86 on the surface of the body 50. A compression spring 88 (FIG. 5) extends between an inner surface of the knob 70 and a shoulder on the end of the index pin 78 which passes through the aperture 82a to normally bias the index pin into the aperture. However, by pulling on the handle 76, the handle 76 and knob 70 can be rotated about the centerline of screw 66, causing the gear 74 to rotate gear 82 until a suitable indicia mark 84 can be placed into alignment with a corresponding indicia mark 86 on the body 50. As the gearing is being rotated the threaded portion 66a will cause inward or outward movement of the sliding jaw 56. The engagement of the index pin 78 with the aperture 82a will hold the parts in their desired operating position. When the parts have been suitably adjusted the flank 56f (FIG. 7) of the sliding jaw 56 will be held the desired distance away from the corresponding flanks 50f and 52f of the rivet slide body 50 and and the upper slide body 52, respectively. In addition, the shoulder portions 56s and 52s will also be suitably spaced apart. It should be noted that the spacing between the flanks 56f on the one hand and 52f and 50f on the other hand is specific to the diameter of the tail of a rivet which is indicated by its "dash number". It is this spacing which must be suitably adjusted as the head, regardless of its diameter, will sit upon the shoulder which is initially V-shaped as can best be seen in the section shown in FIG. 7.

Secured to the top of the body 50 and upper slide body 52 is a cover 90 which is provided with a suitable internal cavity or recess 90r as well as laterally outwardly extending mounting feet 90f, the shank portion of suitable mounting hardware 92 passing therethrough, the hardware 92 securing the cover 90 to the body 50, 52. A rear cover 94 is mounted upon the cover 90 by suitable screws 96 (FIG. 6), the rear cover closing the recess 90r to the rear. Mounted upon the rear surface of cover 94 is retainer assembly, indicated generally at 98 in FIG. 1, which assembly is for the purpose of retaining the discharge end of the non-dedicated feed tube 18. To this end, the retainer assembly includes a retainer plate 100 (FIGS. 3 and 6) which is pivotally secured on the rear cover 94 by a shoulder screw 102, the retainer plate further carrying a thumbscrew 104 which may be released for the purposes of swinging the retainer plate 100 from its retaining position illustrated in FIG. 6 to an open position where the discharge end of the non-dedicated feed tube may be placed or withdrawn from within a suitable cavity defined by the rear cover and the retainer plate.

Figure 3:
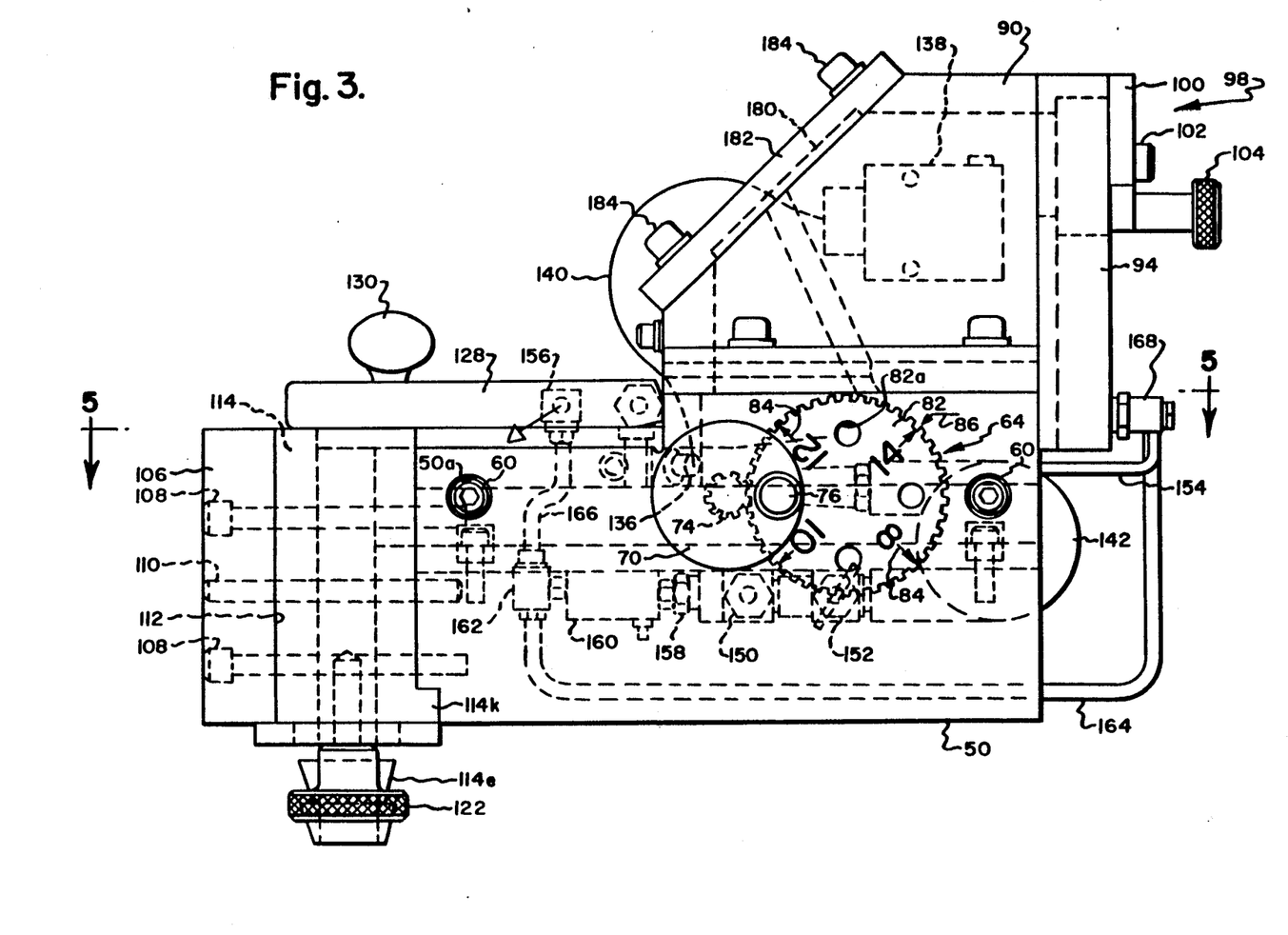
FIG. 3 is a right-side view of the orientating apparatus shown in FIG. 1 in an enlarged scale, the apparatus being rotated in a clockwise direction somewhat from that position it would normally occupy during use, its normal in use position being shown in FIG. 1.
Figure 4:
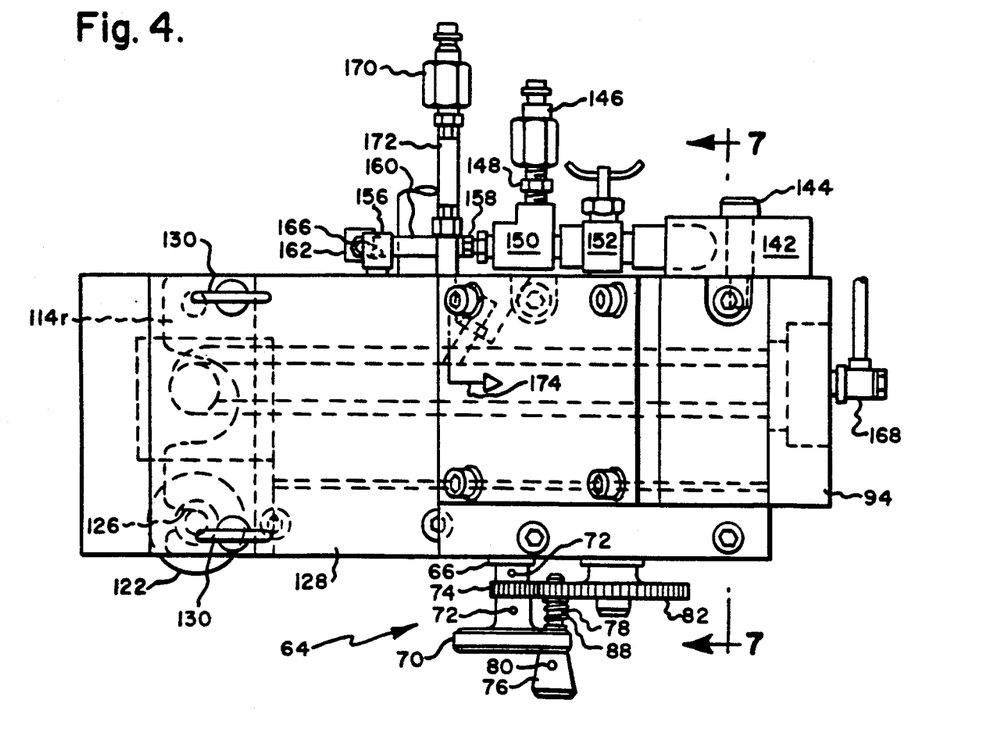
FIG. 4 is a top view of the apparatus shown in FIG. 3.
Figure 5:
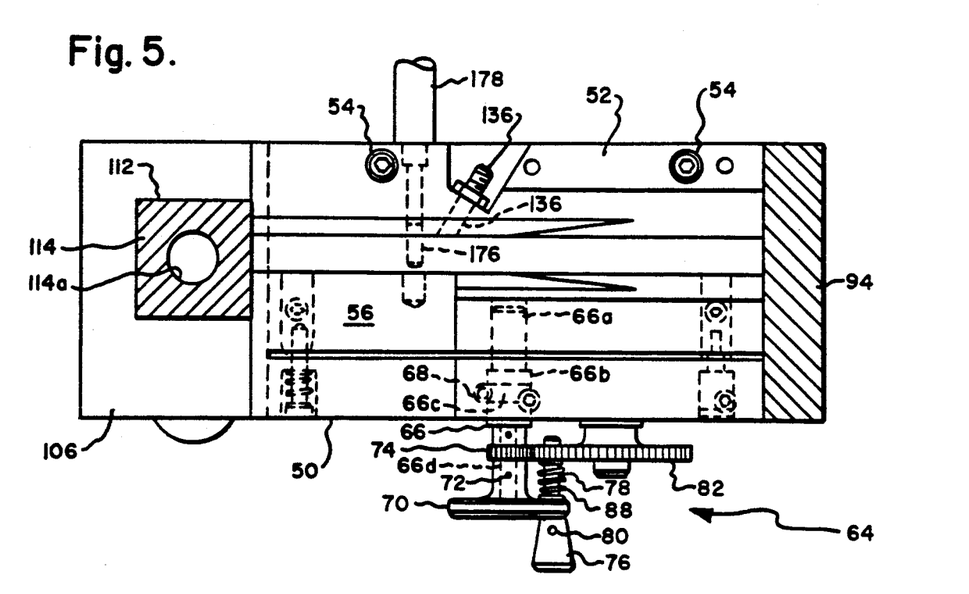
FIG. 5 is a top-sectional view of the apparatus shown in FIG. 3, this view being taken generally along the line 5—5 in FIG. 3.

A front extension 106 is disposed to the front of slide body 50 shown to the left in FIGS. 3 and 5. As can be seen the front extension has the same cross-section as the rivet slide body. It is held in place by socket-head cap screws 108 which pass through suitable apertures in the front extension and are received in threaded apertures in the body 50, this being best illustrated in FIG. 3. An alignment pin or dowel 110 also is received within suitable apertures. The front extension is provided with a vertically extending channel 112 which receives a discharge coupling 114 which is generally square in cross-section, the coupling being provided with an aperture 114a which serves as a discharge opening. Opposed ramps 114r (FIG. 4) lead to the opening 114a. The coupling is further provided with a barbed extension 114e (FIGS. 3 and 6) which receives one end of a dedicated feed tube. The coupling is also provided with a key 114k to ensure that it is properly located.

Figures 6, 7:
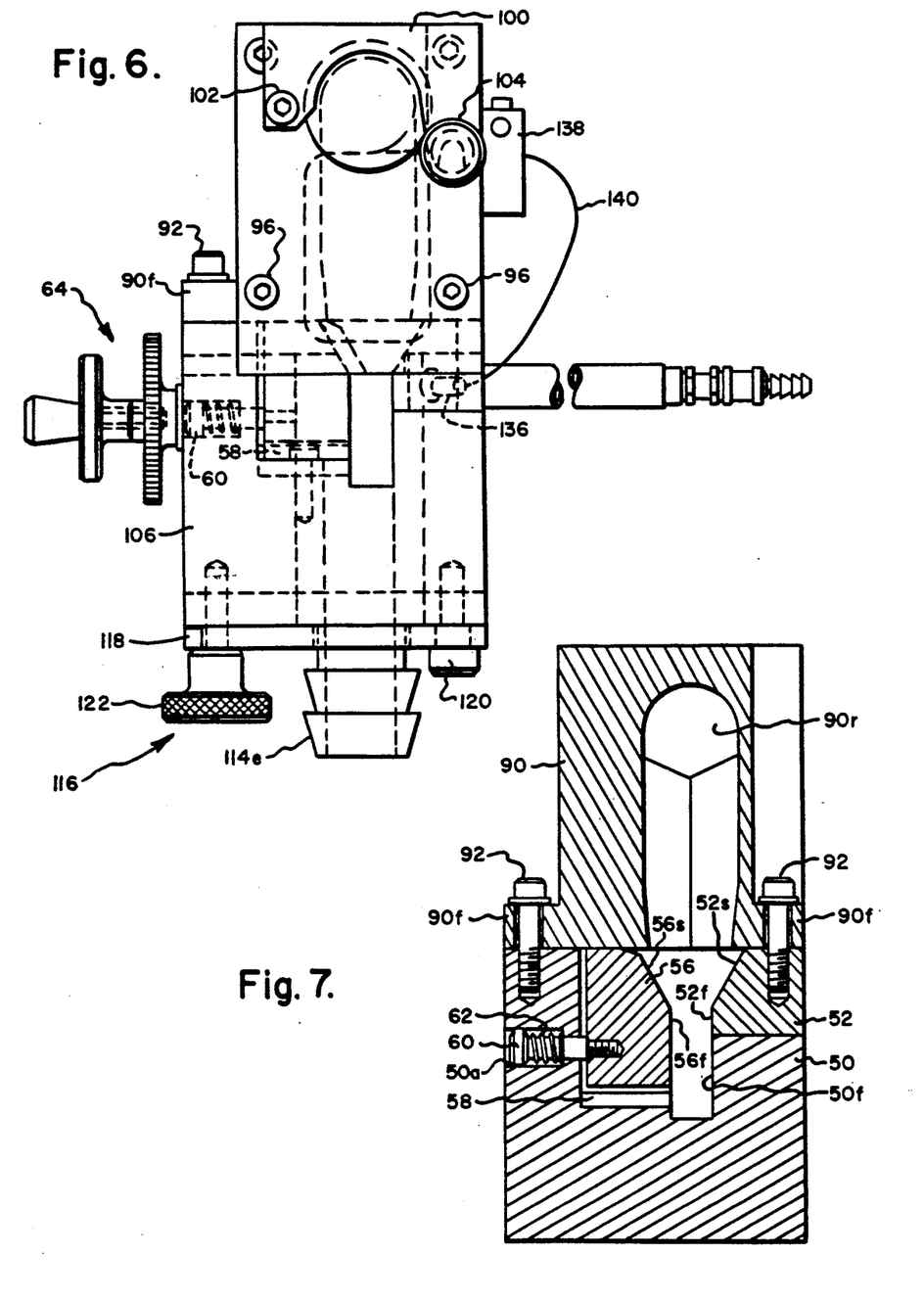
FIG. 6 is a rear view of the injecting apparatus shown in FIG. 3.
FIG. 7 is a rear-sectional view of the injecting apparatus shown in FIG. 3, this view being taken generally along the line 7—7 in FIG. 4.
Figure 8:
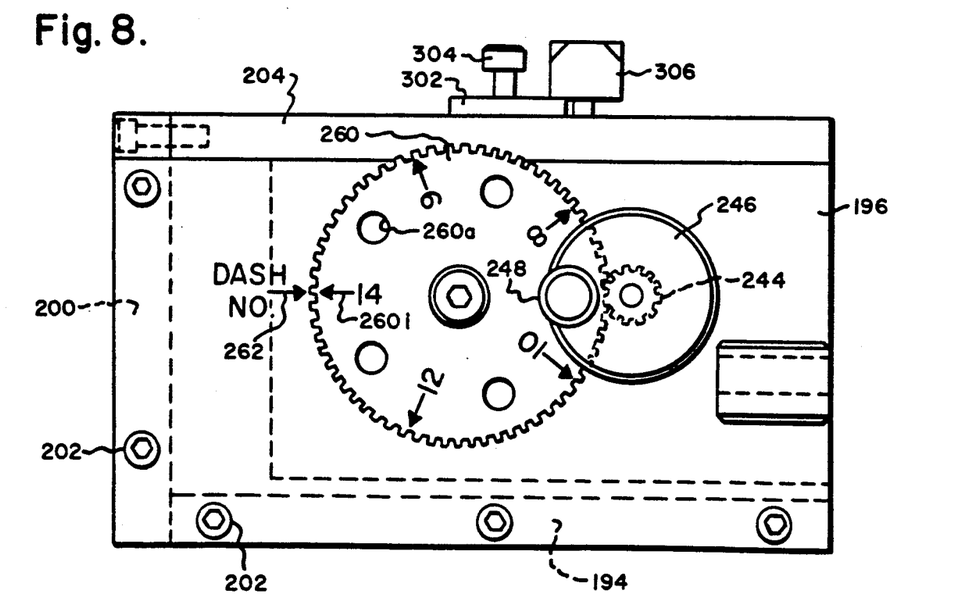
FIG. 8 is a left-side view of the injecting apparatus shown in FIG. 1.

Further, indicated generally at 116, retaining means are provided for retaining the discharge coupling 114 and dedicated feed tube 16. The further retaining means 116 is of a similar construction to the retaining means 98, and thus include a retainer plate 118 which is pivotly secured to the body 106 by a shoulder screw 120 (FIG. 6). The retainer plate 118 is pivotal between open and closed positions and may be retained in its closed position by a thumbscrew 122. The retainer plate is provided with a C-shaped cutout for engaging the extension 114e of the coupling 114. In addition, a further notch 126 (FIG. 4) is provided in the retainer plate 118, the notch engaging the thumbscrew 122.

The body 50 is provided with a notch or step in its upper surface forwardly of the cover 90 and a further cover 128 extends over this notched portion, the further cover 128 being held in place by thumbscrews 130.

In order to facilitate the operation of the adjustable orientator 12 a control assembly is provided, which assembly includes a first detector 132 (FIG. 1) in the form of ring proximity sensor, which transmits a signal to controller 134 when a fastener has passed through the discharge end of the non-dedicated feed tube. The controller 134 is additionally interconnected with an optical scanner assembly including an optical pickup 136 (FIGS. 5 and 6) and an optical pickup processor 138, the pickup and processor 136, 138 being interconnected by a fiber optic cable 140.

In addition to the control assembly 132 through 140, additional air-driven devices and controls are provided. In order to ensure that the fasteners will progress along the shoulder portions 52s, 56s, an air-driven vibrator 142 is provided which vibrator is suitably mounted on the body 50 by means of a shoulder screw 144 (FIG. 4). The vibrator is in turn connected with a constant air supply through a constant air supply fitting 146, nipple 148, tee 150, and needle valve 152. The constant air supply is additionally connected to a suitable rivet assist blow tube 154 (FIG. 3) and orificed fitting 156 by additional fitting 158, flow control or needle value 160, tee 162, fluid lines 164, 166, and a still further fitting 168 which connects air line 164 with air line or blow tube 154.

In addition to the constant air supply which is used to ensure that the fasteners will move along the shoulder portions 52s and 56s towards the discharge opening 112, blow-back air is also provided, this air being introduced through a valved air supply fitting 170 (FIG. 4), a needle valve 172, and thence by suitable air passages to provide blow-back air as indicated by the arrow 174.

The adjustable orientator is operated by initially adjusting the flank spacing of the jaws 152, 156 to a distance just slightly in excess of the tail diameter of the fastener to be oriented. Shop air supply is then initiated through fitting 146 and valved shop air, under the control of controller 134 is then connected to fitting 170. Fasteners will now be introduced at selected time intervals through the discharge end of the non-dedicated feed tube 118. The passage of a fastener through the discharge end will be sensed by the ring proximity senser 132 and a suitable signal will be transmitted to the controller 134 to initiate the operation of a timer. In the meantime, a stop 176 (FIG. 5), which is a piston rod, will be extended to block the movement of a passage beyond the optical sensing area, the stop being interconnected to a piston within an air cylinder assembly 178 which is in turn suitably interconnected with shop air by a valved connector under the control of controller 134. The cylinder assembly 178 will normally be biased to a retracted position by an internal spring (not shown) and the introduction of air to the cylinder assembly 178 will cause the stop to be extended. The fastener which passes through the discharge end of the non-dedicated feed tube will be propelled against a polyurethane pad 180 carried by a damper cover 182 which is secured to the top front of cover 90 by means of cap screws 184. The polyurethane pad 180 will dampen the impact of the fastener as it is projected against the damper cover and the fastener will tumble within the cut-out portion 90r until it falls upon the shoulder portions 52s, 56s of the jaws 52, 56. In normal operation the tail of the fastener will drop between the flanks 52f, 50f, and 56f of the jaws, the head of the fastener being supported by the shoulder portions 52s and 56s. The fastener will be propelled from the right-hand side to the left-hand side as viewed in FIGS. 3 through 5, both due to the operation of the vibrator 142, as the right-hand side is held at a higher location than the left-hand side as can be seen from FIG. 1, and also by the action of the air introduced into the body through air line 154, as well as gravity and momentum of fastener. When the presence of a fastener is detected by the optical pickup 136 a signal will be sent by the controller 134 to a valve (not shown) which will cause the stop 176 to retract and then permit the further movement of the fastener to the discharge opening 112, the fastener then falling through the discharge opening into the inlet end of the dedicated feed tube assembly 16, the dedicated feed tube assembly being so selected that its inner diameter is suitable for those fasteners which are being assembled to the workpieces. In the event that a fastener should become caught or otherwise fail to become suitably oriented, its presence will not be sensed by the optical pickup 136. If the optical pickup does not sense a fastener within 2 seconds or any other suitable timed period selected by the operator, the timer within controller 134 will initiate the operation of blow-back air wherein spurts of air, indicated by arrow 174, are caused by progressively valving the source of air to fitting 170. These spurts of air will cause a retumbling action of the fastener to facilitate its orientation. In the event that the senser 136 does not sense the presence of a fastener after a further suitable series of "blow backs" an alarm will be initiated at the controller 134. (Blow backs are spaced in 1 second intervals)

Dedicated Feed Tube

The dedicated feed tube assembly 16 includes an inlet portion (no number) which is secured to the discharge coupling 114 and an intermediate tubular portion 186 and a discharge end or coupler 188. The coupler 188 is provided with an annular groove 190 which may be engaged by a detent in the manner set forth below.

Adjustable Injector

The adjustable injector 14 is best shown in FIGS. 8 through 13 and includes an injector body indicated generally at 192, the injector body being provided with a box-like cavity. The injector body is formed from a bottom plate 194, left and right side plates 196, 198, respectively, and a rear end plate 200. The various plates are held together by suitable cap screws 202. The front side of the injector body is open. As can best be seen from FIG. 9 the adjustable injector is provided with a top cover plate 204 also held in place by suitable screws 206. The forward end of the top cover plate 204 is provided with a circular aperture 208. A horizontal transversely extending aperture is formed in the top cover plate 204 in line with the circular aperture 208 and a ball detent assembly, indicated generally at 210, is disposed therein, the ball 212 of the assembly 210 projecting slightly into the aperture 208. The purpose of the ball is to engage the groove 190 of the coupling assembly 188 to retain the discharge end of the dedicated feed tube assembly in its proper position in the adjustable injector.

Mounted within the box-like cavity of the injector body is an injector slide, indicated generally at 214 (in FIGS. 11-13), which slide is moveable from a first retracted position, illustrated in the various FIGS., to a second fastener injecting position. The injector slide includes a base portion 216, left-hand and right-hand side portions 218, 220, respectively, a back portion 222, and a top portion or stop plate 224. The various portions 216 through 224 are secured to each other in a manner not material to the present invention. An injector knife 226 (FIG. 13) and a pair of left-hand and right-hand spaced apart adjustable jaws 228, 230, respectively, are mounted above the base portion 216. To this end, the injector knife 226, which is of a relatively thin plate-like construction, is guided between two pair of lower guides and two pair of upper guides. The lower guides consist of left-hand and right-hand guides 232 which are secured by socket-head cap screws 234. The upper guides, which are supported upon the stop plate 224, are of the same construction and therefore bear the same reference numerals. The injector knife 226 is provided with an elongated slot 226s (FIG. 11) through which an intermediate portion 236 of a screw assembly 238 passes. The screw assembly includes left-hand and right-hand threaded portions 240, 242, as well as suitable spacers and bearing portions. A portion of the screw assembly 238 extends through a suitable aperture 196a in the left-hand side plate 196 of the injector body 192. Mounted on an exterior portion of the screw assembly 238 is a gear 244 and handwheel 246 which carries manually engagable knob 248. The screw assembly can be formed in any manner but is preferably formed by securing various parts to a shaft 250 by means of roll pins 252. The left and right adjustable 228, 230 jaws are provided with threaded apertures 254 (FIG. 12) through which the threaded portions 240, 242 extend. In order to take up any backlash which may exist, compression springs 256 bear against the jaws 228, 230 one end of each of the compression springs being received in a suitable aperture in a side plate 218, 220.

The forward ends of each of the jaws is provided with a suitable notched portion 228n, 230n which may receive the tail of a headed fastener. The forward end of each of the jaws is suitably adjusted by rotating the knob 248 so that the spacing between the forward ends of the jaws is just slightly less than the diameter of the tail. The forward end of each of the jaws is provided with a pressure pad 258 which is maintained in an outwardly extending position by a spring action so that the pressure pad may be moved back against spring pressure as a fastener is being ejected by the injector knife 226. Each pad 258 is carried by a pin 259 (FIG. 10) which is in turn provided with a groove which receives a flat-washer 259c. The spring action for each pad 258 is accomplished by a pair of spring detent assemblies 259d similar to that shown at 212.

The centerline of the notches 228n, 230n is closely concentric to the centerline of the discharge end 188 of the dedicated feed tube 16. Thus, as a headed fastener is being projected downwardly through the dedicated feed tube it will be propelled into the location between the fingers with the tail end of the headed fastener being received within the notches 228n, 230n. In order to ensure that the proper spacing is maintained an indicia gear 260 (FIG. 8) is provided, which gear is in engagement with the gear 244 associated with the handwheel 246 so that when the knob 248 is engaged and rotated the indicia gear will also be caused to be rotated. The indicia gear will be rotated to such a position that one of the indicia 260i on the gear 260 is lined up with an indicia mark 262 on the surface of the left plate 196. When this happens the index pin 264 carried by the knob 248 may be spring-biased into an aperture 260a of the gear 260. It can be seen from the above that the rotating knob 248 and index pin 264 are of the same construction as the rotating knob 76 and index pin 78 of the adjusting mechanism shown in FIGS. 3 through 7. Thus, a compression spring 266 is additionally provided which will normally bias the end of the pin 264 into the aperture 260a.

As has previously indicated, the injector slide can be moved from a first fastener receiving position to a second fastener injection position and also the injector can be moved from a retracted position to an extended position. To this end, as can be seen from FIGS. 1 and 13a, a cylinder assembly indicated generally at 268 is provided, the cylinder assembly including a piston (not shown) disposed within a cylinder 270. One end of the cylinder is provided with a flange 272 which may be secured in any desired manner to the back plate 200 of the injector body 192. To this end, as can be seen from FIG. 13, the back plate is provided with a suitable aperture 200a, the flange being concentric with the aperture. A piston rod 274 extends through the flange 272 and the aperture 200a, the end of the piston rod 274 remote from the cylinder 270 being secured to a rod extension 276 by roll pin 278. The rod extension 276 is in turn secured to a forked sleeve 280 by another roll pin 282. The bifurcated end of the sleeve 280 is in turn rigidly secured to the rear end of the injector knife 226. As can best be seen from FIG. 11 when all parts are in their normal retracted position, with the rod extension 276 and bifurcated sleeve 280 being disposed in their retracted position, shown to the right in FIGS. 11 and 13 the rear end of the injector knife 226 will be bearing against the front surface of the back wall 222. To this end a compression spring 284 disposed about the rod extension 276 will normally force the wall 222 into engagement with the injector knife 226, the ends of the compression spring being received within suitable annular recesses in walls 200 and 222.

Figures 11, 13A:
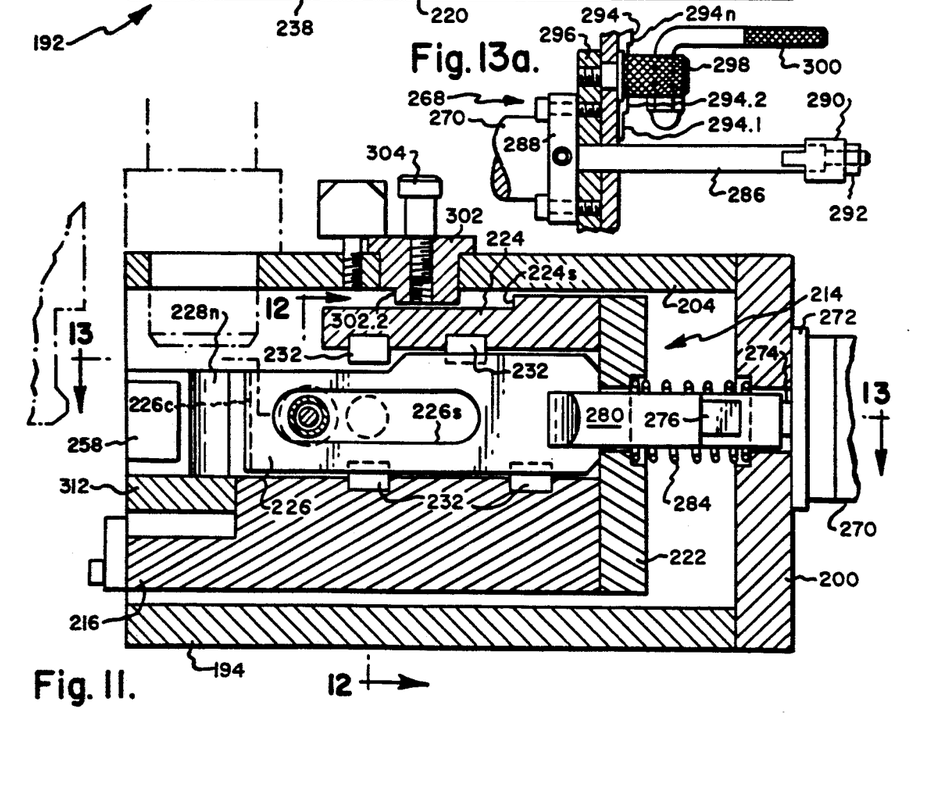
FIG. 11 is a right-side sectional view of a portion of the injecting apparatus shown in FIG. 1, this view being taken generally along the line 11—11 of FIG. 10.
FIG. 13a is a top view taken generally along the line 13a—13a in FIG. 1.
Figure 12:
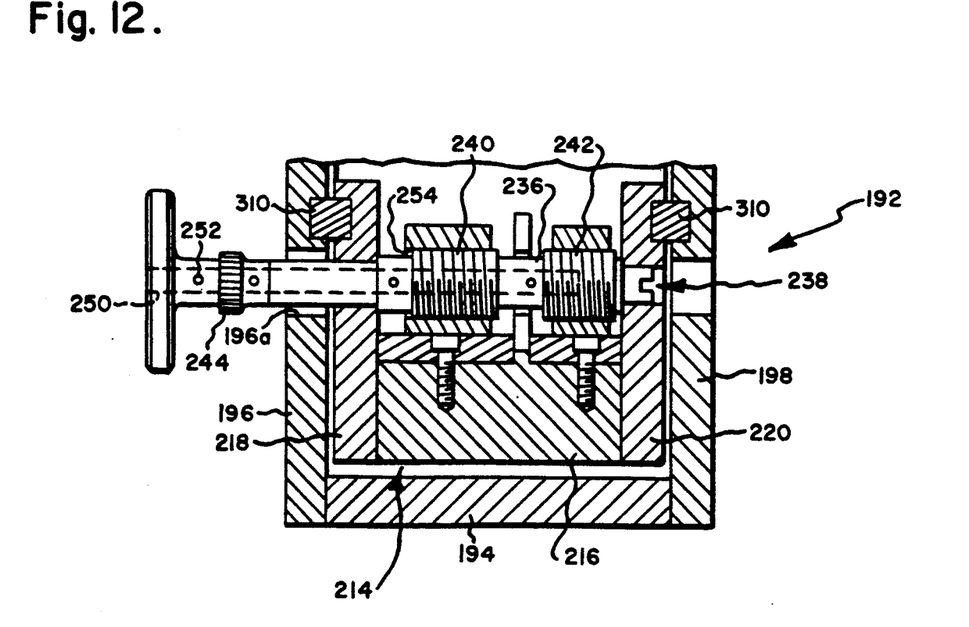
FIG. 12 is a front-sectional view of the injecting apparatus shown in FIG. 11, this view being taken generally along the line 12—12 in FIG. 11.

With further reference to FIGS. 1 and 13a it can be seen that a piston rod extension 286 is provided which extends beyond the rear flange 288 of the cylinder assembly. Mounted on the rear end of the rod 286 is a stop 290 which is held in place by nut 292 which engages a threaded extension of the rod extension 286. As can best be seen from FIG. 1 the stop 290 is provided with two laterally spaced apart stop portions 290s. In order to adjust the stroke of the piston and correspondingly the movement of the injector an adjustable stop plate 294 is provided which has various stop surfaces 294.1, 294.2, . . . 294.n may be engaged by the stop portions 290s. The adjustable stop plate is supported for transverse sliding movement on a mounting plate 296 and may be secured in place by thumbscrew 298 provided with a handle 300.

Figure 9:
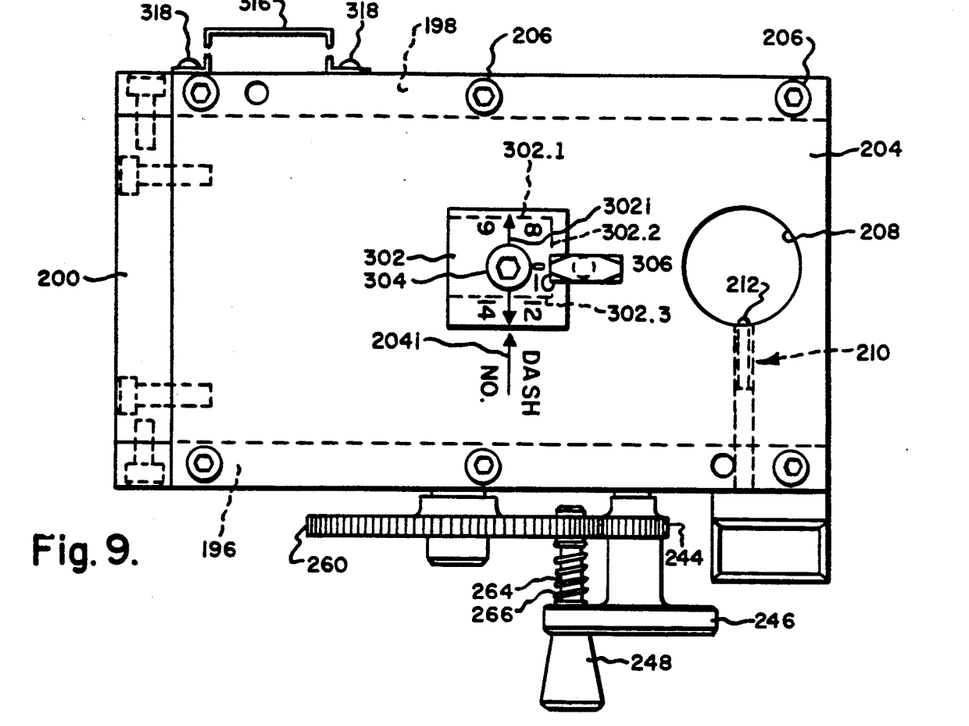
FIG. 9 is a top view of the injecting apparatus shown in FIG. 8.
Figure 10:
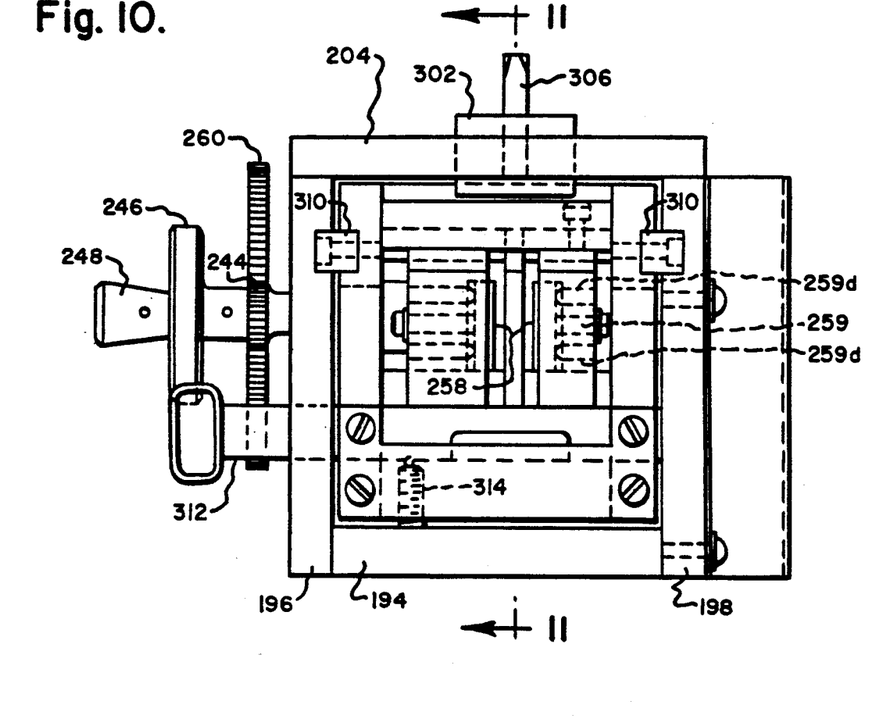
FIG. 10 is a front-end view of the injecting apparatus shown in FIG. 9.

The stroke of the injector slide is also varied by an adjustable stop mechanism best shown in FIGS. 9 and 11 which consists essentially of a stop block 302 received within a suitable aperture in the top cover plate 204, the stop block being provided with suitable indicia 302i, which may also be lined up with corresponding indicia 204i on the cover plate 204. A shoulder screw 304 is screwed into a suitable aperture in the stop block 302 and acts as a handle. The stop block can be withdrawn from the aperture, rotated to its proper position and reinserted into the aperture. A lower portion or stop surface 302.1, 302.2, or 302.3 of the stop block is capable of being engaged by a step portion 224s of the stop plate 224 to limit the outward movement of the injector slide 214. The stop block 302 can be held in its adjusted position by turn screw 306.

The adjustable injector is operated by initially adjusting the adjustable jaws 228, 230 so that the spacing between the pressure pads 258 is just slightly less than the tail diameter of the fastener to be inserted. As it is necessary to shift the parts forwardly to properly position the fastener so that it is concentric with the centerline 308 of the fastener grasping fingers 46 (FIG. 1) it is necessary to adjust the stop positions for both the injector slide and the injector. This is done by suitably positioning the adjustable stops 302 and 294. It is of course presumed that the apparatus has been properly positioned with respect to the fingers 46 by previously adjusting the spacing through shims 36 and through the slide assembly 38. Once the parts have been suitably adjusted it is only necessary to initiate the operation of the cylinder by introducing air behind the piston in cylinder 270 in any suitable manner to cause the piston rod 274 to move forwardly (to the left as viewed in FIGS. 12 and 13). When this occurs, initially the injector slide assembly and injector will move together as the compression spring 284 forces the injector slide assembly 214 to move with the injector knife 226 as the compression spring will cause the front wall of the back plate 222 to be maintained in engagement with the rear edge of the injector knife 226 until the step surface 224s engages the stop 302. As this is happening the injector slide assembly will be supported by gibs 310 which are received within suitable slots between the left-hand and right-hand walls. Thus, one of the gibs 310 is positioned between the left side plate 196 and the left-hand slide portion 218. Another gib 310 is positioned between the right side plate 198 and the right-slide portion 220.

Figure 13:
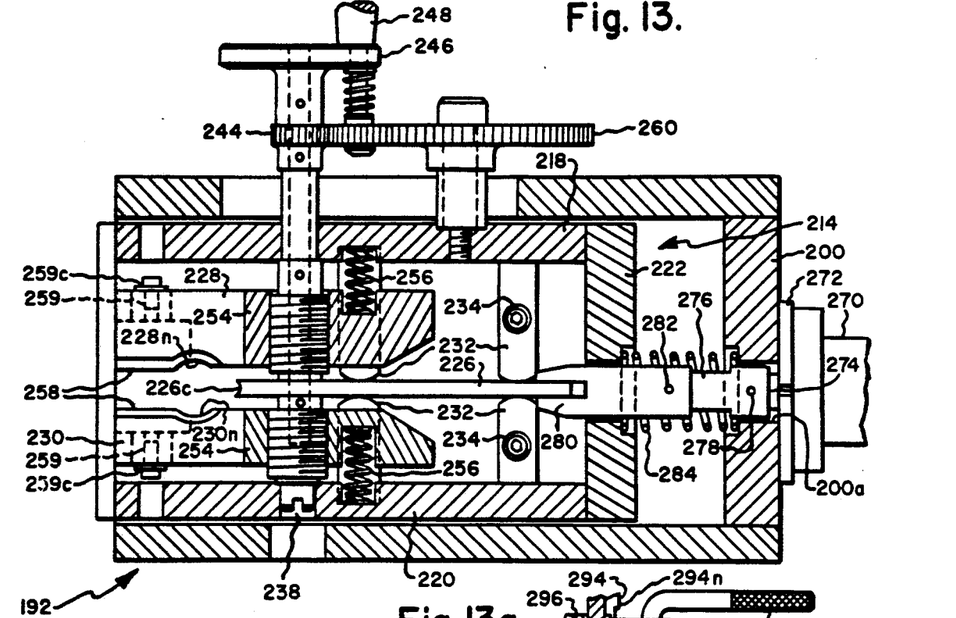
FIG. 13 is a top-sectional view taken generally along the line 13—13 in FIG. 11.

Continued movement of the injector knife 226 after stop 302 has been encountered by step 224s of the top plate of the injector slide assembly 214 will cause the injector knife to move relative to the jaws 228, 230 causing the curved leading end 226c to engage the stem of the fastener and force it between the pressure pads 258 until it clears the compression pads and is then free to enter into the fastener grasping fingers 46. When the fastener has been injected into the fingers 46, the piston rod will be caused to be withdrawn so that another cycle of operation can be performed. It should be appreciated that the control means 134 may also be utilized in the initiation of the operation of the cylinder assembly 268. While the air lines to the cylinder assembly 268 have not been shown, it should be appreciated that any suitable air lines and valving may be employed.

While operation has been described where a headed fastener is being inserted into the grasping fingers 46, it is also possible to use the injector assembly 14 for the purpose of inserting slug rivets into slug rivet receiving fingers. When the injector is used for this purpose it is used without the orientator 12 and a dedicated feed tube will extend directly from the slug selection hopper to the injector. When a slug rivet has been received between the jaws 228 and 230 it will be caused to be ejected by the injector knife 226. The slug will be moved from the right to the left as viewed in FIG. 13 and will be firmly held in position during ejection by the pressure pads 258. In addition, when the slug is originally received within the notched areas 228n and 230n, it will be supported by a slug rest 312. The slug rest 312 is of a C-shaped configuration as can be seen from FIG. 10 and is held in a groove on the forward end of the base portion 216 by a detent assembly 314. As shown in FIG. 11 the slug rest is in its uppermost position where it supports slugs having the shortest length. However, if longer slugs are to be inserted the slug rest may be inverted to another position where the slugs are supported at a lower level. However, when using headed fasteners having a long tail length it may be desirable to entirely remove the slug rest 312 and to this end it may be stored in a slug rest storage clip 316 which is secured to a side of the right side plate 198 by screws 318 as can be seen in FIG. 9.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. Apparatus for orientating and injecting fasteners (F) into fastener grasping fingers (46), the fasteners being received from a non-dedicated feed tube (18) through which a variety of fasteners may be propelled from a fastener selection apparatus, the fasteners having heads (h) and tails (t) of differing diameters; said apparatus comprising in combination:

a mounting frame (20);

adjustable orientation means (12) mounted on the frame for orienting and discharging fasteners, the orientation means having retaining means (98) for retaining an end of the non-dedicated feed tube (18), spaced apart jaws (50, 52, and 56) the spacing of which may be adjusted for orientating fasteners having differing diameter tails received from the non-dedicated feed tube, the orientation means further having a discharge opening (114a) through which the oriented fasteners may be discharged;

a dedicated feed tube assembly (16) having receiving and discharge ends (116, 188) the receiving end being interconnected with the discharge opening of the orientation means; and adjustable injection means (14) mounted on the frame for injecting fasteners, the injection means having retaining means (212) for retaining the discharge end of the dedicated feed tube, a pair of spaced apart jaws (228, 230) the distance between the jaws being adjustable for receiving fasteners having tails of differing diameters, and a injector knife (226) for pushing the fastener into fastener grasping fingers (46).

2. The apparatus as set forth in claim 1 wherein the adjustable injection means (14) further includes an injector slide (214), the spaced apart jaws being supported by the injector slide, and the injector slide being movable between a first fastener receiving position and a second fastener injecting position 3. The apparatus as set forth in claim 2 wherein the adjustable injection means (14) further includes adjustable stop means (302) for limiting the movement of the injector slide.

4. The apparatus as set forth in claim 1 wherein the adjustable orientation means (12) includes a detector (136, 138) for determining whether or not a fastener received by the adjustable orientation means has become oriented.

5. The apparatus as set forth in claim 1 wherein the adjustable injection means is mounted on the frame by means of a mounting bracket (26), the mounting bracket being secured to the frame for front-to-back adjustment, and the adjustable injection means being secured to the mounting bracket for adjustable side-to-side movement.

6. An adjustable orienting apparatus (12) for orienting fasteners, the fasteners (F) being received from a non-dedicated feed tube (18) through which a variety of fasteners may be propelled from a fastener selection apparatus, the fasteners having heads (h) and tails (t) of differing diameters; said orienting apparatus comprising:

a body (50) having a discharge opening (114a);

a pair of spaced apart opposed jaws carried by the body, each of the jaws including a shoulder portion (52s, 56s) upon which the head (h) of a fastener (F) may rest and a flank portion (50f, 56f), the jaws (50, 52, and 56) being adjustable towards and away from each other so that the distance between the flank portions of the jaws may be adjusted to a distance just slightly in excess of the tail diameter of the fastener to be oriented, the tail (t) of a fastener when aligned extending between the flank portions, the pair of jaws terminating adjacent the discharge opening;

a cover (90) mounted on the body above the pair of spaced apart jaws, the cover having an internal cavity (90r);

retaining means (98) on the cover for retaining the discharge end of a non-dedicated feed tube (18), fasteners being discharged in a non-oriented manner from the non-dedicated feed tube into the cavity (90r) of the cover, the cavity permitting tumbling of a fastener until it falls upon the jaws (50, 52, and 56), the head (h) of the fastener (F) being supported by the shoulder portion of the jaws and the tail (t) of the fastener passing between the flanks of the jaws to cause the fastener to be oriented;

further retaining means (118, 120, 122) adjacent the discharge opening in the body for retaining the inlet end (116) of a dedicated feed tube assembly (16); and means (142) for facilitating the movement of an oriented fastener to that end of the spaced apart jaws located adjacent the discharge opening in the body.

7. An adjustable orienting apparatus (12) of orienting fasteners, the fasteners (F) being received from a non-dedicated feed tube (18) through which a variety of fasteners may be propelled from a fastener selection apparatus, the fasteners having heads (h) and tails (t) of differing diameters; said orienting apparatus comprising:

a body (50) having a discharge opening (114a);

a pair of spaced apart opposed jaws carried by the body, each of the jaws including a shoulder portion (52s, 56s) upon which the head (h) of a fastener (F) may rest and a flank portion (50f, 56f), the jaws (50, 52, and 56) being adjustable towards and away from each other so that the distance between the flank portions of the jaws may be adjusted to a distance just slightly in excess of the tail diameter of the fastener to be oriented, the tail (t) of a fastener when aligned extending between the flank portions, the pair of jaws terminating adjacent the discharge opening;

retaining means (98) interconnected with the body (50) for retaining the discharge end of a non-dedicated feed tube (18);

further retaining means (118, 120, 122) adjacent the discharge opening in the body for retaining the inlet end (116) of a dedicated feed tube assembly (16);

means (142) for facilitating the movement of an oriented fastener to that end of the spaced apart jaws located adjacent the discharge opening in the body; and detecting means (132) for detecting whether or not a fastener has passed through the discharge end of the non-dedicated feed tube and further detecting means (136, 138) for detecting whether or not a fastener has become oriented between the spaced apart jaws.

8. The apparatus for orienting fasteners as set forth in claim 7 further comprising stop means (176) disposed adjacent the spaced apart opposed jaws for stopping the movement of fasteners along the jaws, and control means (134) operable to release the stop means when a fastener has been detected.

9. The apparatus for orienting fasteners as set forth in claim 7 further including blow-back means (170, 172) and control means (134) for initiating the operation of the blow-back means when the introduction of a fastener into the apparatus has been detected but when an oriented fastener has not been detected after a suitable time interval.

10. An adjustable injection apparatus (14) for injecting fasteners (F) into fastener grasping fingers (46), the injection apparatus comprising:

an injector body (192) having a box-like cavity therein, the cavity being open at one end, there being a wall portion (200) opposite the open end;

an injector slide (214) mounted within the box-like cavity for sliding movement between a fastener receiving and loading position and a fastener injecting position wherein a portion of the injector slide extends beyond the injector body;

a pair of spaced apart opposed jaws (228, 230) carried by the injector slide, the jaws being capable of receiving a fastener (F) when the injector slide is in its loading position and for carrying the fastener towards the fastener grasping fingers (46) as the injector slide is moved to its injecting position;

an injector knife (226) carried by the injector slide (214) for movement relative thereto from a retracted position to an extended position, the injector knife when in its retracted position being contacted by a portion of the injector slide as the injector slide is moved from its loading position to its injecting position, and the injector knife subsequently being moved from its retracted position to its extended position to cause a fastener (F) to be shifted from the opposed jaws to fastener grasping fingers (46);

fluid cylinder means (268) for moving the injector and injector slide, the fluid cylinder means including a cylinder (270) mounted on the end wall (200) of the injector body, and a piston rod (274) which extends through an aperture (200a) in the end wall and which is connected to one end of the injector knife 226;

stop means (302) extending between the injector body and the injector slide for limiting the movement of the injector slide as it moves from its loading position to its injecting position; and compression spring means (284) disposed about the piston rod and extending between the end wall (200) and the injector slide (214), the parts being so arranged that when the piston rod is moved from a retracted position to a partially extended position the spring will cause corresponding movement of the injector slide until the stop is engaged by the slide, and further movement of the piston rod away from its partially extended position to its fully extended position causing the injector knife to be moved from its retracted position to its extended position as its injector slide is held from further movement by the stop means.

11. The injector apparatus as set forth in claim 10 wherein the stop means (302) is adjustable to establish differing injectioning positions for the injector slide.

12. The injector apparatus as set forth in claim 10 wherein the opposed jaws (228, 230) are adjustable towards and away from each other to accept fasteners having differing tail diameters.

13. The injector apparatus as set forth in claim 10 wherein the stroke of the piston rod may be adjusted.

* * * * *